(12) United States Patent
Hendrix et al.

(10) Patent No.: US 11,131,862 B2
(45) Date of Patent: Sep. 28, 2021

(54) TOTAL INTERNAL REFLECTION (TIR) PRISM BEAMSPLITTER

(71) Applicant: VIAVI Solutions Inc., San Jose, CA (US)

(72) Inventors: Karen Denise Hendrix, Santa Rosa, CA (US); Warren Hendricks, Santa Rosa, CA (US)

(73) Assignee: VIAVI Solutions Inc., San Jose, CA (US)

( * ) Notice: Subject to any disclaimer, the term of this patent is extended or adjusted under 35 U.S.C. 154(b) by 345 days.

(21) Appl. No.: 16/027,011

(22) Filed: Jul. 3, 2018

(65) Prior Publication Data

US 2019/0011714 A1    Jan. 10, 2019

Related U.S. Application Data (60) Provisional application No. 62/528,839, filed on Jul. 5, 2017.

(51) Int. Cl.
*G02B 27/12* (2006.01)
*G02B 27/14* (2006.01)

(52) U.S. Cl.
CPC ......... *G02B 27/126* (2013.01); *G02B 27/142* (2013.01)

(58) Field of Classification Search
CPC .... G02B 27/12; G02B 27/126; G02B 27/142; G02B 27/28; G02B 17/04; G02B 5/30; G02B 1/02; G03B 21/14; G03B 21/28

USPC .............. 359/640, 627, 629, 634, 639, 588, 359/485.01, 485.06, 831, 833, 837
See application file for complete search history.

(56) References Cited

U.S. PATENT DOCUMENTS 2,740,317 A * 4/1956 Kelly .................. G02B 27/142
                                                            359/588
5,724,185 A    3/1998 Hickey et al.

OTHER PUBLICATIONS

Wikipedia, "Goos—Hänchen effect", https://en.wikipedia.org/wiki/Goos%E2%80%93H%C3%A4nchen_effect, Jan. 3, 2018, 2 pages.
James D. Rancourt, "Optical Thin Films Users' Handbook", Jun. 1, 1987, 2 pages.
John David Jackson, "Classical Electrodynamics", 1962, 833 pages.

* cited by examiner

*Primary Examiner* — Jie Lei
(74) *Attorney, Agent, or Firm* — Harrity & Harrity, LLP (57) ABSTRACT

A dichroic prism beamsplitter may include a medium with a refractive index greater than approximately 1.0. The dichroic prism beamsplitter may include a plurality of layers sandwiched by the medium. The plurality of layers may include an equivalent structure including at least one layer with a refractive index that is less than a threshold refractive index for total internal reflection. The at least one layer may be associated with a thickness less than or equal to a threshold thickness associated with total internal reflection for a threshold wavelength. The at least one layer may cause total internal reflection for a first wavelength range that is less than or equal to the threshold wavelength and causes evanescent wave coupling for a second wavelength range that is greater than the threshold wavelength.

20 Claims, 8 Drawing Sheets

TOTAL INTERNAL REFLECTION (TIR) PRISM BEAMSPLITTER

RELATED APPLICATION(S)

This application claims priority under 35 U.S.C. § 119 to U.S. Provisional Patent Application No. 62/528,839, filed on Jul. 5, 2017, the content of which is incorporated by reference herein in its entirety.

BACKGROUND

An optical system may include at least one optical element. For example, the optical system may include a dichroic beamsplitter to divide a beam into multiple portions. In this case, the dichroic beamsplitter may direct portions of a beam into a first optical path and a second optical path. The dichroic beamsplitter may direct a first range of wavelengths of incident light into the first optical path and a second range of wavelengths of the incident light into a second optical path. The first optical path may be reflected wavelengths and the second optical path may be transmitted wavelengths (e.g., through an interface at a non-normal angle of incidence).

SUMMARY

According to some possible implementations, a dichroic prism beamsplitter may include a medium with a refractive index greater than approximately 1.0. The dichroic prism beamsplitter may include a plurality of layers sandwiched by the medium. The plurality of layers may include an equivalent structure including at least one layer with a refractive index that is less than a threshold refractive index for total internal reflection. The at least one layer may be associated with a thickness less than or equal to a threshold thickness associated with total internal reflection for a threshold wavelength. The at least one layer may cause total internal reflection for a first wavelength range that is less than or equal to the threshold wavelength and causes evanescent wave coupling for a second wavelength range that is greater than the threshold wavelength.

According to some possible implementations, an optical element may include a plurality of layers in a dichroic prism beamsplitter configured to cause total internal reflection and evanescent wave coupling. The plurality of layers may include one or more equivalent structures. The at least one equivalent structure, of the one or more equivalent structures, may include one or more layers with a refractive index less than a refractive index threshold and a thickness less than a thickness threshold for the total internal reflection and the evanescent wave coupling to split a beam into a first portion at a first wavelength range and a second portion at a second wavelength range.

According to some possible implementations, an optical system may include an equivalent structure-based dichroic prism beamsplitter to divide a light beam into a first portion directed in a first direction associated with a first optical path and into a second portion directed in a second direction associated with a second optical path. The equivalent structure-based dichroic prism beamsplitter may include at least one layer with a thickness that is less than or equal to a threshold thickness associated with total internal reflection. The optical system may include at least one optical sensor disposed in at least one of the first optical path or the second optical path to receive at least one of the first portion or the second portion.

DETAILED DESCRIPTION

The following detailed description of example implementations refers to the accompanying drawings. The same reference numbers in different drawings may identify the same or similar elements.

A dichroic beamsplitter may be achieved using a set of thin film layers deposited on a flat substrate, which may cause reflection and transmission of incident light. When used at non-normal incidence, the set of thin film layers may separate the incident light into multiple optical paths. Alternatively, the dichroic beamsplitter may be achieved by immersing a thin multilayer optical coating between two substrate materials (e.g., prisms) to separate light into the multiple optical paths. Such a dichroic beamsplitter may be termed a dichroic prism beamsplitter. Some optical systems may require dichroic prism beamsplitters using a high refractive index substrate material, such as germanium, silicon, zinc selenide, and/or the like. Using a high refractive index material for the substrates introduces complexity to the design and manufacture of a dichroic prism beamsplitter. For example, a range of refractive indices that may be used for the thin multilayer optical coating, without causing total internal reflection (TIR), may be reduced, which may result in an excessively thick multilayer optical coating.

Some implementations, described herein, provide a long wave pass type dichroic prism beamsplitter. In this way, some implementations may achieve wavelength selective reflection by using an equivalent structure containing low refractive index thin layers, which take advantage of high reflectivity at shorter wavelengths (e.g., greater than a threshold reflectivity at less than a threshold wavelength), even approaching total internal reflectance (TIR), and by maintaining high transmission at longer wavelengths (e.g., greater than a threshold transmission at greater than another threshold wavelength) based on evanescent wave coupling. For example, the dichroic prism beamsplitter, to operate over a given range of incidence angles, may include one or more materials and/or one or more layers with less than a threshold refractive index for total internal reflection, and another one or more materials and/or another one or more layers with higher than the same threshold refractive index to form an equivalent structure.

Furthermore, a thickness of a set of thin reflective layers of a refractive index below the threshold refractive index, which may be termed thin TIR layers, may be selected such that a wavelength threshold between an occurrence of total internal reflection and an occurrence of evanescent wave coupling is within a threshold amount of a transition wavelength for the dichroic prism beamsplitter (i.e., between a selected reflected band and a selected transmitted band).

In some implementations, an equivalent structure comprised of individual material layers including at least one thin TIR layer may be used as an element in a repeating thin film coating stack. In some implementations, individual, discrete layers of the equivalent structures and/or elements in a coating stack may vary within the coating stack to optimize a spectral performance of a dichroic filter (e.g., a dichroic prism beamsplitter described herein). In some implementations, the equivalent structure may include greater than two materials, such as a third material, a fourth material, and/or the like. In this way, the equivalent structure may be associated with improved spectral performance, reduced stress, improved environmental durability, and/or the like, and may achieve a desired reflection and/or a desired transmission performance characteristic of a long wave pass dichroic beamsplitter more efficiently than may be achieved using an alternating high/low refractive index quarter-wave stack approach.

Moreover, based on using an equivalent structure containing one or more thin TIR layers to achieve the dichroic prism beamsplitter, the dichroic prism beamsplitter may be associated with improved spectral performance compared to other beamsplitter designs without resulting in increased thickness. Furthermore, some implementations described herein reduce coating thickness relative to other coating designs comprised of layers of materials of a refractive index greater than the threshold refractive index for total internal reflection, thereby reducing lateral beam shift and/or wavefront aberrations due to coating stress and coating nonuniformity, and thereby improving performance of an optical system, such as a high-resolution imaging system. Moreover, based on reducing overall coating thickness and layer count, manufacturing costs may be reduced.

Figure 1:
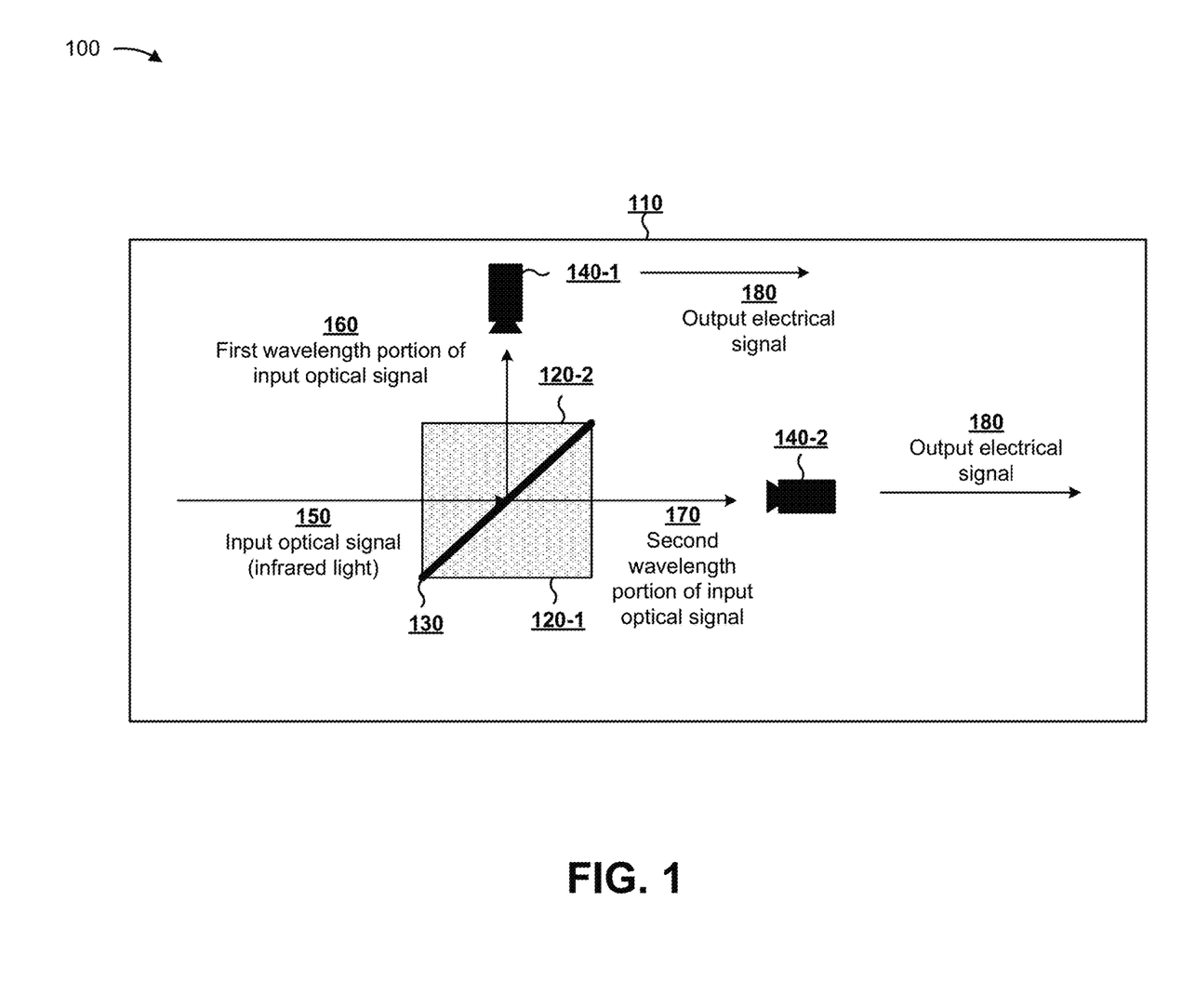
FIG. 1 is a diagram of an example implementation of a dichroic prism beamsplitter described herein.

FIG. 1 is a diagram of an example implementation 100 described herein. As shown in FIG. 1, example implementation 100 includes an optical system 110. Optical system 110 may provide an electrical output corresponding to a sensor determination. Optical system 110 includes a dichroic prism beamsplitter formed from a set of substrates 120-1 and 120-2, which sandwich thin film coating equivalent structure 130, and a set of optical sensors 140, which includes at least one sensor element. In some implementations, optical system 110 may be an optical communication system, an optical sensing system, an optical imaging system, an optical measurement system, and/or the like.

In some implementations, substrates 120 may be a medium formed from a set of prisms (e.g., a first prism and a second prism). For example, substrate 120-2 may be an entrance prism, and substrate 120-1 may be an exit prism. In some implementations, the dichroic prism beamsplitter (e.g., substrates 120 and thin film coating equivalent structure 130 including one or more equivalent structures, including at least one thin TIR layer of thin film coating equivalent structure 130) perform a beamsplitting functionality to direct a first portion (e.g., a shortwave portion 160) of light beam 150 (e.g., light reflected off an object that is to be imaged by optical sensors 140) into an optical path of optical sensor 140-1 and a second portion (e.g., a longwave portion 170) of the same light beam 150 into an optical path of optical sensor 140-2.

In some implementations, another shape of an equivalent structure-based dichroic prism beamsplitter may be utilized. For example, rather than a cube beamsplitter, the dichroic prism beamsplitter may be associated with another shape of cross-section or another angle of incidence (e.g., a non-45 degree angle of incidence).

In this way, based on using a thin film coating equivalent structure 130 for the dichroic prism beamsplitter, the dichroic prism beamsplitter may perform beamsplitting with a reduced coating thickness, reduced lateral beam shift, improved durability, and/or the like relative to other techniques for beamsplitting.

As indicated above, FIG. 1 is provided merely as an example. Other examples are possible and may differ from what was described with regard to FIG. 1.

Figure 2:
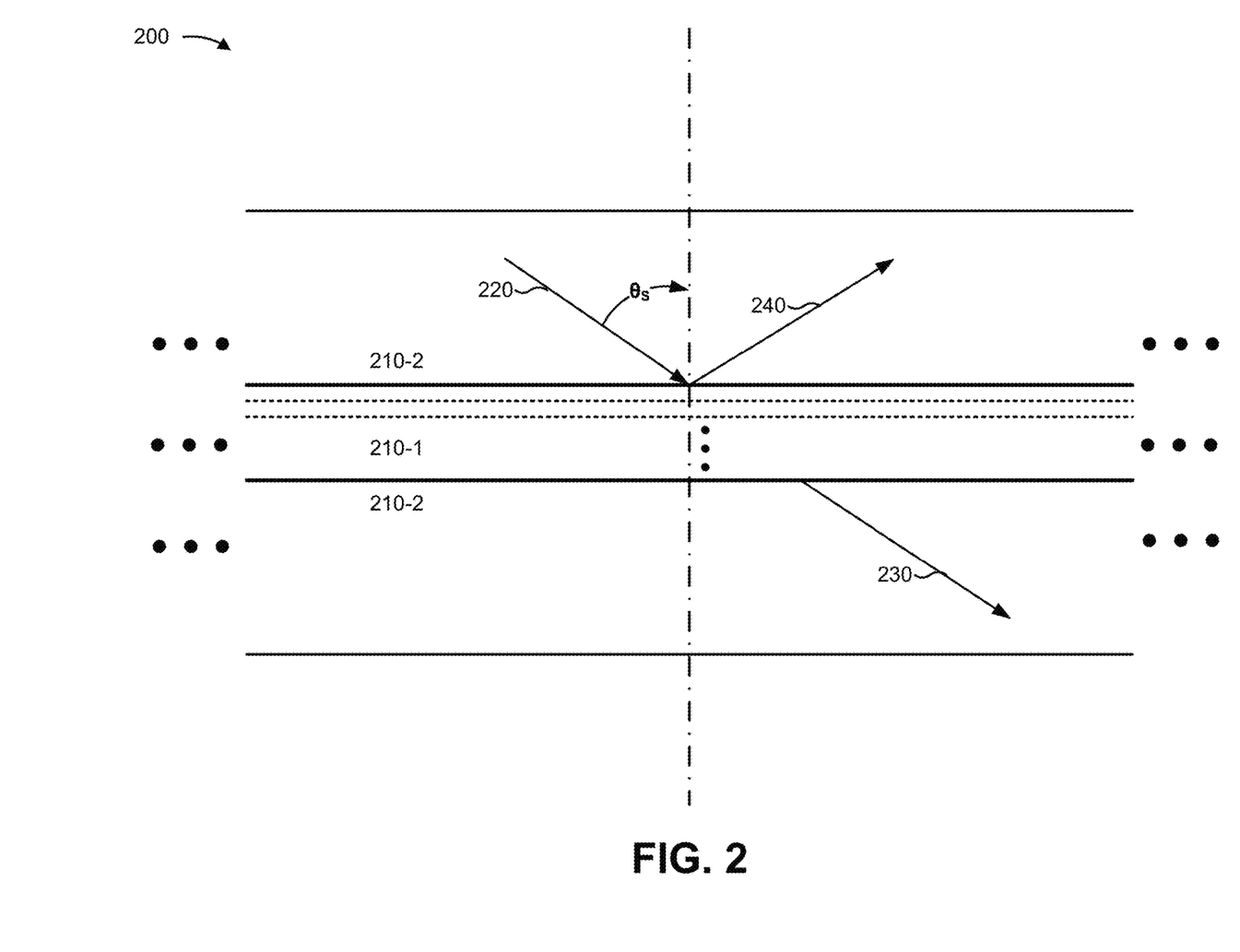
FIG. 2 is a diagram of an example implementation of a dichroic prism beamsplitter described herein.

FIG. 2 is a diagram of an example implementation 200. FIG. 2 shows an example geometry of a dichroic prism beamsplitter 210. In this case, dichroic prism beamsplitter includes a coating 210-1 immersed in a prism 210-2 (e.g., a single prism formed around coating 210-1, a set of two prisms sandwiching coating 210-1, and/or the like).

In some implementations, coating 210-1 may include a set of thin layers, as shown (e.g., less than a threshold thickness layers). For example, coating 210-1 may include a set of layers forming an equivalent structure that include thin TIR layers for a first wavelength band and to not cause total internal reflection for a second wavelength band. In this case, incident light 220 may be directed toward the coating 210-1 at angle $\theta_S$ within dichroic prism beamsplitter 210. A first portion of incident light 220 is passed through to form output light 230 in the second wavelength band and a second portion of incident light 220 is reflected to form output light 240 in the first wavelength band.

In some implementations, layers of coating 210-1 may include, but is not limited to, materials such as oxides, fluorides, nitrides, silicon, silicon dioxide, silicon monoxide, tantalum oxides, germanium, zinc selenide, zinc sulfide, and/or the like. In some implementations, coating materials may be modified by hydrogenation, annealing, ion bombardment, plasma treatment, and/or the like. Although some layers may be described as a specific material, such as silicon (Si), some layers may include (small quantities of) phosphorus, boron, nitrogen, and/or the like.

In some implementations, coating 210-1 may be associated with a specific quantity of layers, m. For example, coating 210-1 of dichroic prism beamsplitter 210 may include a quantity of alternating layers of different refractive indices (e.g., that form at least one equivalent structure) of between approximately 1 layer and 200 layers, less than approximately 100 layers, less than approximately 50 layers, less than approximately 20 layers, less than approximately 10 layers, less than approximately 5 layers, less than approximately 3 layers, and/or the like.

In some implementations, dichroic prism beamsplitter 210 may be associated with multiple refractive indices, such as a first refractive index of prism 210-2, a second refractive index of coating 210-1, a third refractive index of coating 210-1, and/or the like. For example, coating 210-1 may include low refractive index layers with a refractive index less than a threshold for total internal reflection, as described below, and high refractive index layers with a refractive index greater than the threshold for total internal reflection. In this case, the low refractive index layers and the high refractive index layers may form the equivalent structure of coating 210-1. In some implementations, one or more other layers may be included in the coating. The threshold for total internal reflection is defined by the equation: $n_F < n_S * \sin(\theta S)$, where $n_F$ represents a threshold refractive index of the low refractive index layers below which TIR occurs, $n_S$ represents a refractive index of prism 210-2, as described in more detail with regard to FIGS. 3A-3F, and $\theta_S$ is the angle of incidence in the prism.

In some implementations, refractive indices of layers of coating 210-1 be between approximately 0.5 and 4.0, of between approximately 1.0 and 4.0, of between approximately 1.38 and 3.5, of between approximately 2.0 and 3.5, of approximately 2.4, and/or the like. In some implementations, coating 210-1 may have a refractive index less than a threshold refractive index for total internal reflection for shorter wavelengths (e.g., less than a threshold wavelength) and greater than another threshold refractive index for long wavelengths (e.g., greater than or equal to the threshold wavelength), thereby achieving wavelength-selective beamsplitting.

In some implementations, coating 210-1 may achieve high reflectance using thin TIR layers for shorter wavelengths (e.g., wavelengths less than a threshold wavelength, such as less than approximately 3 micrometers (μm)) with less coating thickness than other beamsplitters that use layers of materials of refractive indices above a TIR threshold. Moreover, the thin non-quarter-wave stack layers may provide an equivalent refractive index at longer wavelengths (e.g., wavelengths greater than or equal to the threshold, such as greater than or equal to 3 μm), which enables transmittance. As a result, coating 210-1 may be associated with a reduced quantity of layers, a reduced thickness, a reduced beam shift, and/or the like relative to other techniques (e.g., quarter-wave stack-based techniques utilizing materials with a refractive index greater than the total internal reflection threshold) for beamsplitting.

In some implementations, a layer of coating 210-1 may be associated with less than a threshold layer thickness, such as less than 5 micrometers, less than 1 micrometer, less than 0.5 micrometers, less than 0.3 micrometers, less than 0.1 micrometers, and/or the like. In some implementations, multiple layers forming coating 210-1 may be associated with less than the threshold thickness. In some implementations, another layer of coating 210-1 may be associated with greater than the threshold thickness. In some implementations, a total thickness of dichroic prism beamsplitter 210 may be greater than 50 micrometers. In some implementations, a total thickness of dichroic prism beamsplitter 210 may be less than 50 micrometers, less than 30 micrometers, less than 15 micrometers, less than 10 micrometers, less than 5 micrometers, less than 1 micrometer, and/or the like. In some implementations, a total thickness of coating 210-1 may be greater than 50 micrometers. In some implementations, a total thickness of coating 210-1 may be less than 50 micrometers, less than 30 micrometers, less than 15 micrometers, less than 10 micrometers, less than 5 micrometers, less than 1 micrometer, and/or the like.

In some implementations, coating 210-1 may be fabricated using a sputtering procedure. For example, coating 210-1 may be fabricated using a pulsed-magnetron based sputtering procedure to sputter at least one layer to form an equivalent structure, as described herein. In some implementations, multiple cathodes may be used for the sputtering procedure, such as a first cathode to sputter a first material and a second cathode to sputter a second material, thereby forming a multi-material layer. In some implementations, coating 210-1 may be manufactured using electron-beam (e-beam) evaporation, thermal evaporation, ion-assisted deposition (IAD), ion-beam sputtering (IBS), and/or the like.

In some implementations, dichroic prism beamsplitter 210 may be associated with a particular spectral range, such as a near-infrared spectral range, a short-wavelength infrared spectral range, a mid-wavelength infrared spectral range, a long-wavelength infrared spectral range, and/or the like. For example, dichroic prism beamsplitter 210 may be associated with a total spectral range from approximately 1000 nm to approximately 20000 nm, from approximately 1500 nm to approximately 6000 nm, from approximately 1000 nm to approximately 8000 nm, from approximately 500 nm to approximately 10000 nm, and/or the like.

As indicated above, FIG. 2 is provided merely as an example. Other examples are possible and may differ from what was described with regard to FIG. 2.

FIGS. 3A-3F are diagrams of example characteristics relating to an example implementation of a dichroic prism beamsplitter described herein.

Figure 3A:
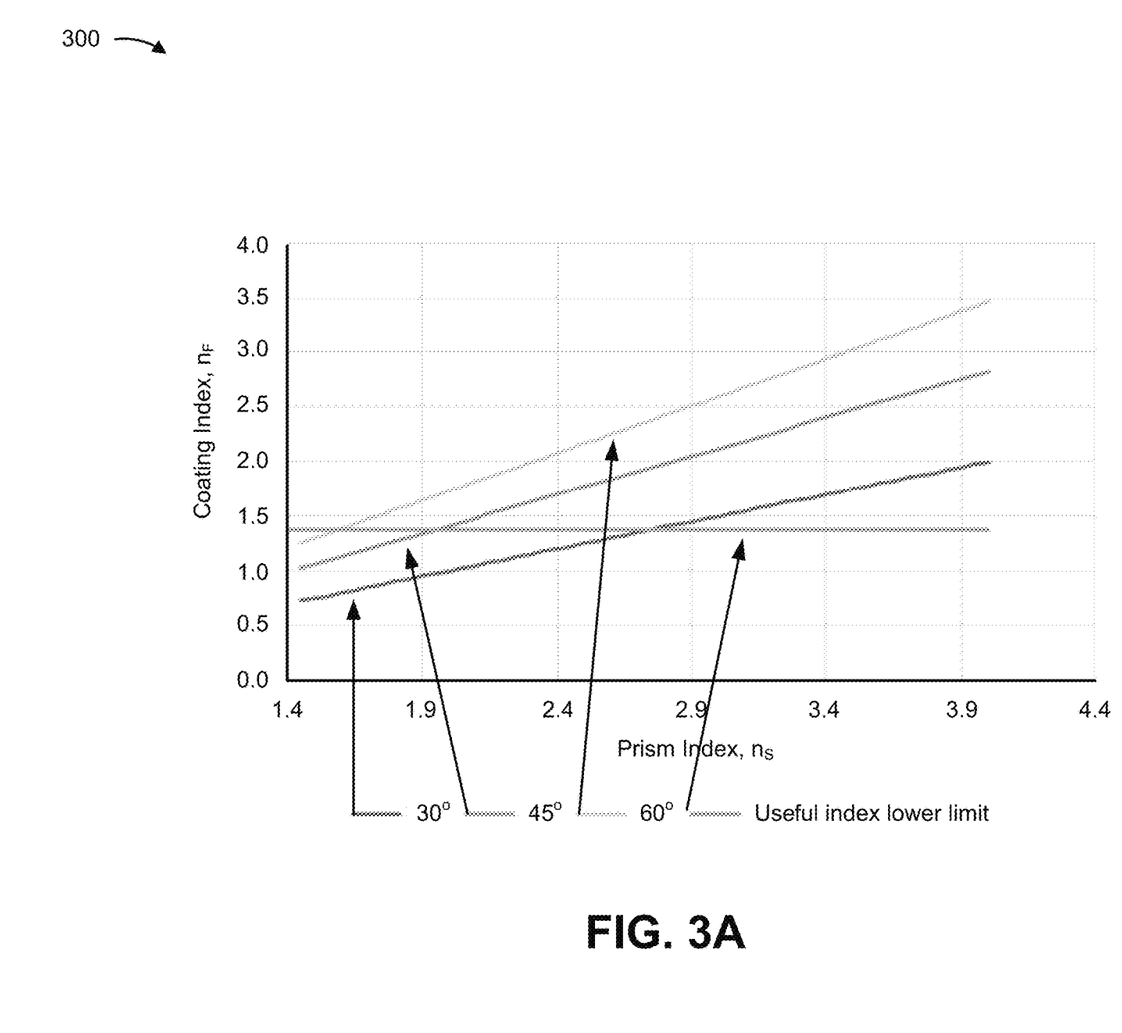
FIGS. 3A-3F are diagrams of example characteristics relating to an example implementation of a dichroic prism beamsplitter described herein.

As shown with regard to FIG. 3A, and by chart 300, a threshold low refractive index for a coating material for a dichroic prism beamsplitter is determined for different angles of incidence as a function of the prism refractive index, $n_S$. As shown, a line for each angle indicates a threshold refractive index for a layer at the interface of two prisms below which TIR will occur. As a result, a dichroic prism beamsplitter described herein may include refractive indices below the line and above the lower limit threshold, as shown. The refractive index of 1.38, represents an approximate practical lower limit that is available for coating materials. A plot area of chart 300 below the line for each angle of incidence, but above the 1.38 index line is a range of coating indices that could be used that meet the TIR condition for that angle of incidence, in some implementations. In other implementations, other angles of incidence and refractive indices may be possible.

As an example, for a dichroic prism beamsplitter associated with an angle of incidence of 60 degrees, a threshold refractive index for a coating may range from approximately 1.38 to approximately 3.5 and a prism refractive index may range from approximately 1.55 to approximately 4.0. Similarly, for a 45 degree angle of incidence, a prism refractive index may be greater than 1.95 for a threshold refractive index of 1.38.

Figure 3B:
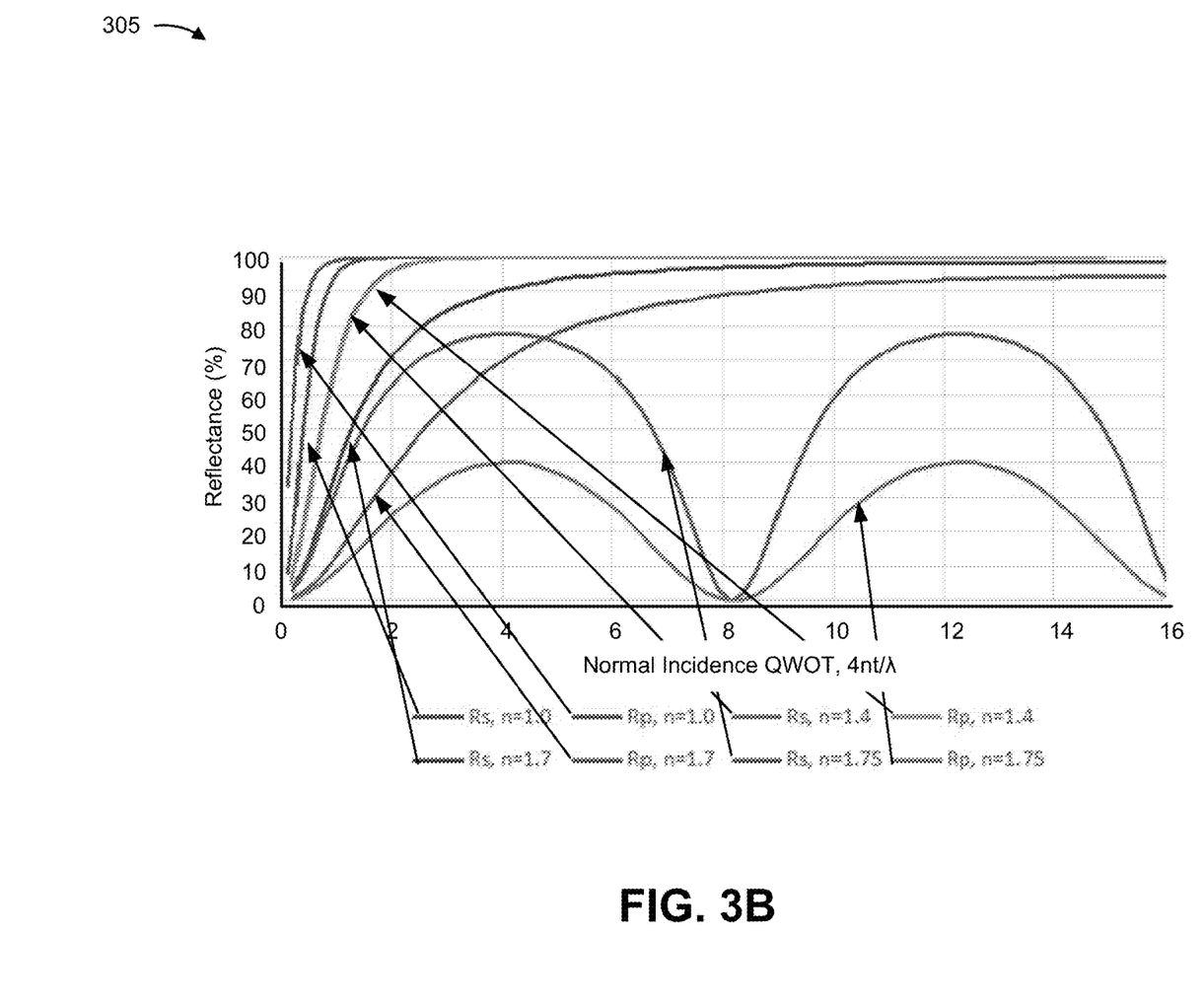

As shown in FIG. 3B, and by chart 305, the s-plane and the p-plane reflectance at a 3 micrometers wavelength as a function of a normal incidence quarter-wave optical thickness (QWOT) of the coating in a zinc selenide prism with a prism refractive index of 2.4 and at 45 degree angle of incidence. Total internal reflectance may occur for a thin film in the zinc selenide prism with a coating refractive index between approximately 1.0 and approximately 1.7.

Figure 3C:
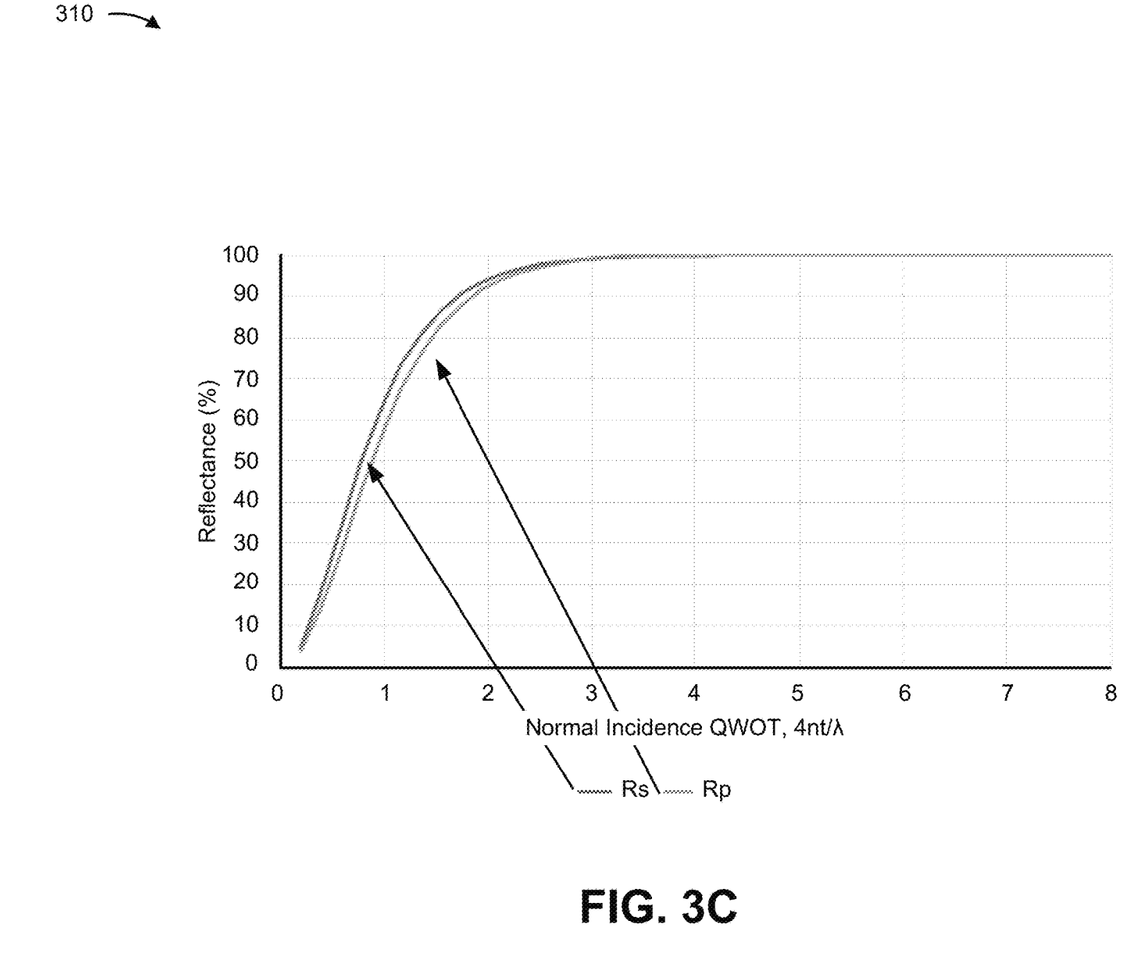

As shown in FIG. 3C, and by chart 310, another reflectance versus normal incidence QWOT is determined for a coating refractive index of 1.45 in a dichroic prism beamsplitter with a prism refractive index of 2.4 at 45 degrees and for a 3 micrometers wavelength. In this case, based on the normal incidence QWOT being configured such that $R_s$ (s-plane reflectance) and $R_P$ (p-plane reflectance) are each at approximately 50% reflectance, a desired transition zone may occur at approximately 3 micrometers. As a result, light of less than a threshold wavelength (e.g., approximately 3 micrometers) is reflected and light greater than or equal to the threshold wavelength (e.g., approximately 3 micrometers) is passed through. In this case, a normal incidence quarter-wave optical thickness $(4n_F t/\lambda)$ will be approximately 0.8. Based on the normal-incidence quarter-wave optical thickness, $4n_F t/\lambda=0.8$ ($\lambda=3$ micrometers), a physical thickness, t, may be calculated as approximately 0.414 micrometers to transmit wavelengths greater than approximately 3 micrometers (e.g., to satisfy a threshold transmittance) and to reflect wavelengths less than approximately 3 micrometers (e.g., to satisfy a threshold reflectance).

Figure 3D:
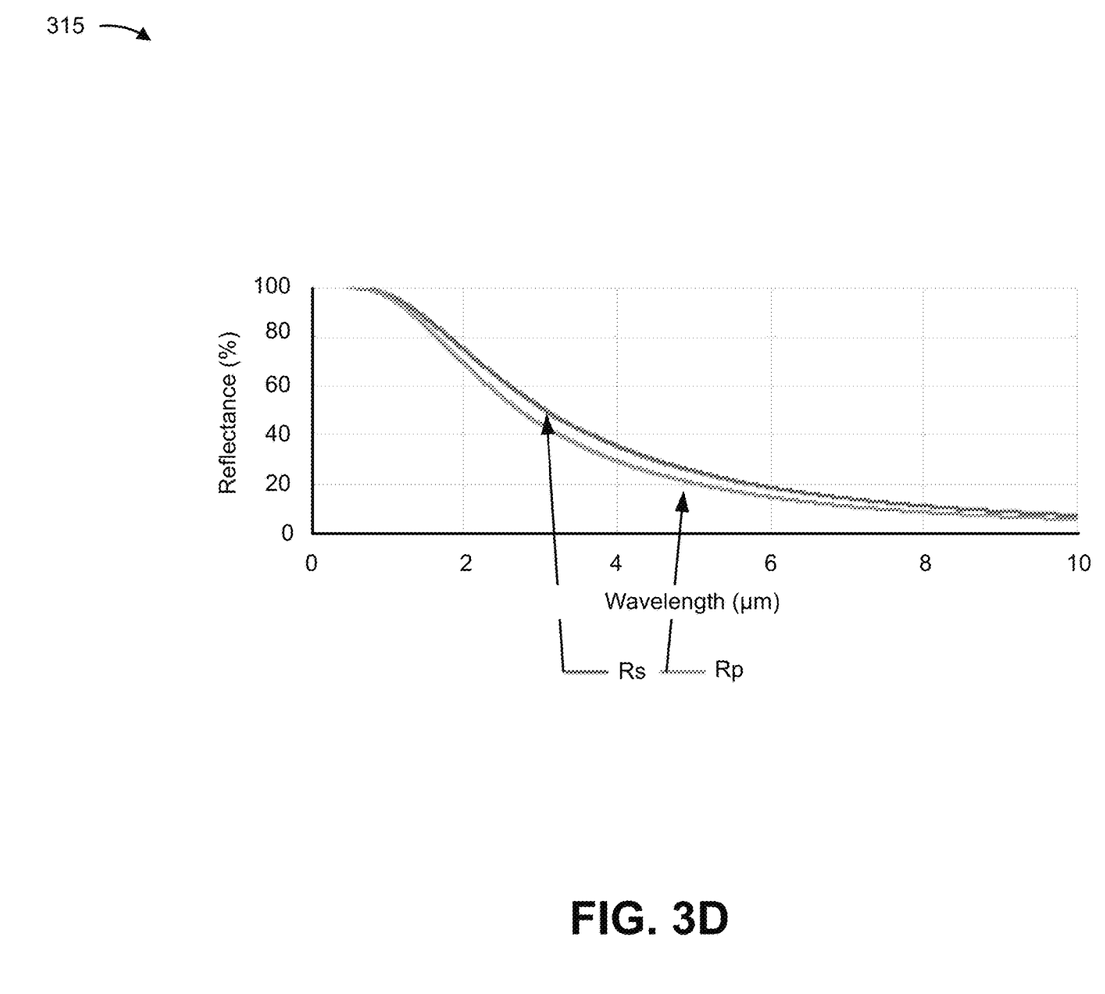

As shown in FIG. 3D, and by chart 315, a specific example of one possible implementation of the invention is described. In this example, a coating refractive index, $n_F=1.45$, a thickness, t=0.414 micrometers, a prism refractive index, $n_S=2.4$, and an angle of incidence, $\theta_S=45$ degrees. Reflectance is plotted as a function of wavelength to show that this specific combination of coating material and thickness will provide the desired transition between high reflectance and high transmittance near 3 micrometers.

Figure 3E:
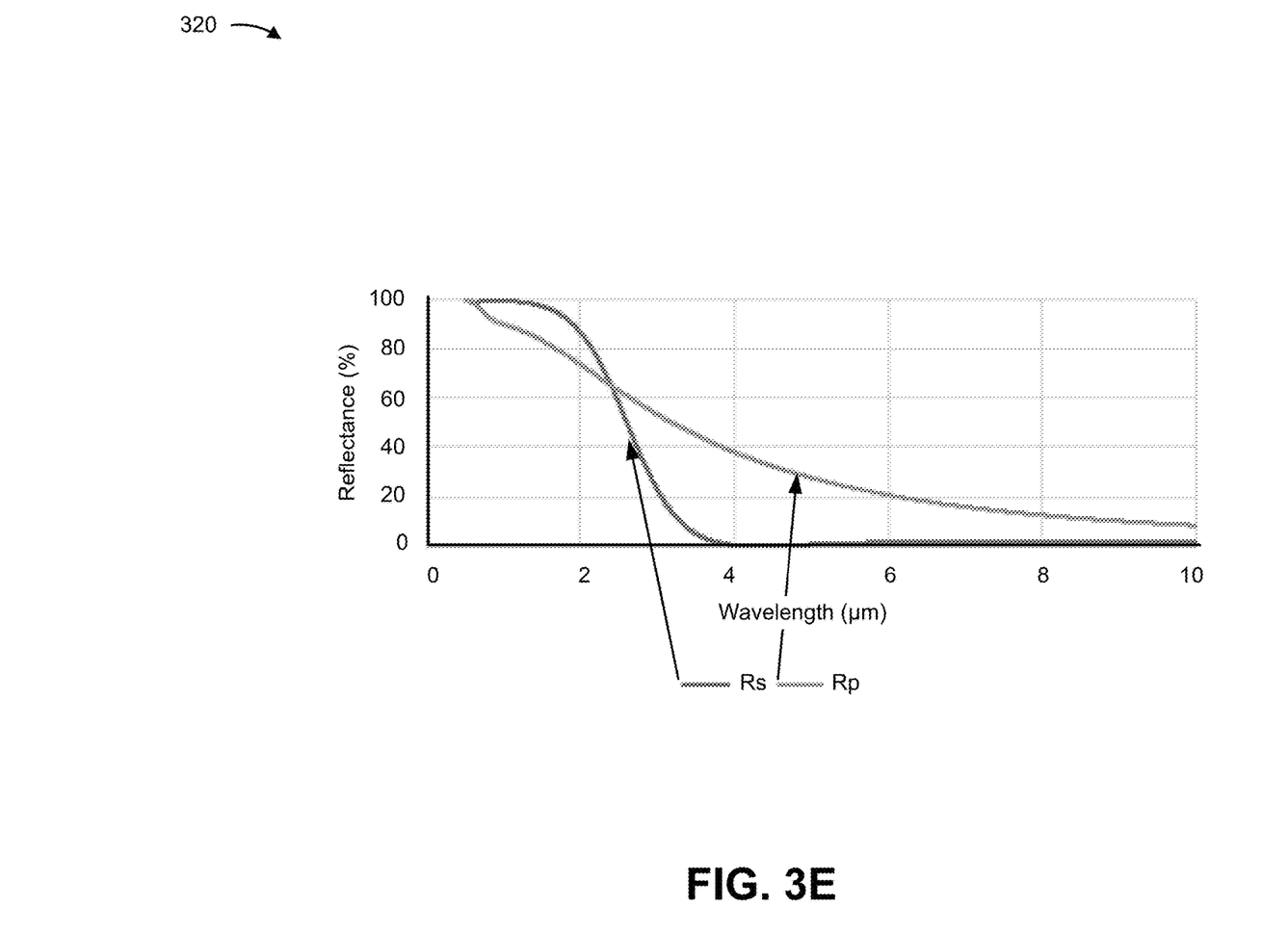

As shown in FIG. 3E, and by chart 320, reflectance is determined for a multilayer configuration using alternating high refractive index layers (e.g., layers of refractive index above the threshold for TIR) and low refractive index layers (e.g., layers of refractive index less than the threshold for TIR). For example, a configuration may include an equivalent coating layer of a refractive index of 2.4 at a normal incidence using alternating layers of a material refractive index below the TIR limit and a 4.2 refractive index material (e.g., above the TIR limit). In this case, to achieve the equivalent refractive index of 2.4, a stack may include a layer thickness of 0.0836 micrometers of the 4.2 refractive index layer, a layer thickness of 0.3019 micrometers of the low refractive index layer, and a layer thickness of 0.0836 micrometers of the 4.2 refractive index layer.

Figure 3F:
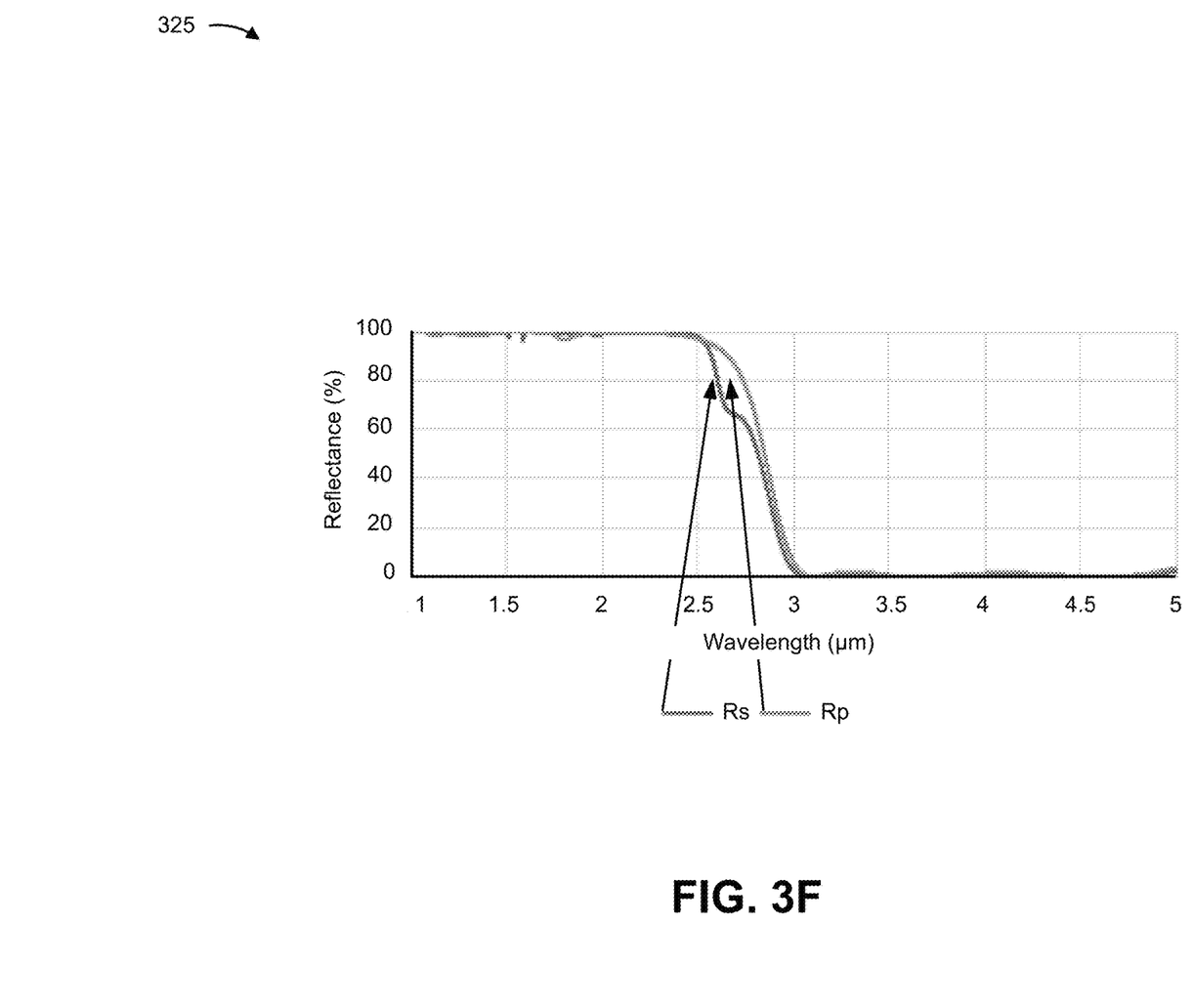

As shown in FIG. 3F, and by chart 325, reflectance may be determined for another configuration with multiple periods of alternating layers used to further increase the steepness of the transition zone. For example, high reflectance is achieved from 1 micrometer to 2.5 micrometers and low reflectance is achieved from 3 micrometers to 5 micrometers. In this case, the configuration is associated with a coating thickness of 3.8 micrometers and 30 layers. The thickest layer of the low refractive index material is 0.313 micrometers. In this way, a configuration may be selected to create a long wavelength pass type of dichroic prism beamsplitter.

As indicated above, FIGS. 3A-3F are provided merely as examples. Other examples are possible and may differ from what was described with regard to FIGS. 3A-3F.

In this way, a dichroic prism beamsplitter with an equivalent structure coating using thin total internal reflection (TIR) layers enables the thin TIR layers to perform beamsplitting of portions of light in different wavelength ranges. Based on using the equivalent structure including at least one layer with a refractive index less than a threshold for total internal reflection for a prism sandwiching the equivalent structure and including a thickness less than a threshold for total internal reflection, a desired dichroic beamsplitting performance can be achieved with a coating thickness that is reduced relative to using other coating designs comprised of layers of refractive indices all greater than the threshold for TIR. By reducing a coating thickness, the dichroic prism beamsplitter will have lower lateral beam shift, thereby improving optical performance of the beamsplitter. Moreover, relative to other designs, the overall thickness may be reduced and the durability may be improved by using the equivalent structure with a thin TIR layers.

The foregoing disclosure provides illustration and description but is not intended to be exhaustive or to limit the implementations to the precise form disclosed. Modifications and variations are possible considering the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A dichroic prism beamsplitter, comprising:
   a medium with a refractive index greater than approximately 1.0; and
   a plurality of layers sandwiched by the medium,
      wherein the plurality of layers includes an equivalent structure including at least one layer with a refractive index that is less than a threshold refractive index for total internal reflection that is based on an angle of incidence,
      wherein the at least one layer is associated with a thickness less than or equal to a threshold thickness associated with total internal reflection for a threshold wavelength,
      wherein the at least one layer causes total internal reflection for a first wavelength range that is less than or equal to the threshold wavelength and causes evanescent wave coupling for a second wavelength range that is greater than the threshold wavelength, and
      wherein the dichroic prism beamsplitter is configured to cause light associated with the first wavelength range to be reflected and light associated with the second wavelength range to be passed through.

2. The dichroic prism beamsplitter of claim 1, wherein the plurality of layers includes another at least one layer with another thickness greater than the threshold thickness.

3. The dichroic prism beamsplitter of claim 1, wherein the at least one layer is two or more layers.

4. The dichroic prism beamsplitter of claim 1, wherein the dichroic prism beamsplitter is configured for angles of incidence of greater than approximately 45 degrees.

5. The dichroic prism beamsplitter of claim 1, wherein the dichroic prism beamsplitter is configured for angles of incidence of greater than approximately 30 degrees.

6. The dichroic prism beamsplitter of claim 1, wherein an equivalent refractive index of the equivalent structure formed by the at least one layer is between approximately 1.38 and 4.2.

7. The dichroic prism beamsplitter of claim 1, wherein the medium is a first prism and a second prism.

8. The dichroic prism beamsplitter of claim 1, wherein the first wavelength range and the second wavelength range are subsets of a total wavelength range of the dichroic prism beamsplitter, and wherein the total wavelength range of the dichroic prism beamsplitter is in a range from approximately 0.1 micrometer to approximately 20 micrometers.

9. The dichroic prism beamsplitter of claim 1, wherein a total thickness of the plurality of layers is less than or equal to approximately 30 micrometers.

10. The dichroic prism beamsplitter of claim 1, wherein the threshold thickness is approximately 0.5 micrometers.

11. The dichroic prism beamsplitter of claim 1, wherein each layer, of the plurality of layers, is associated with a layer thickness of less than 0.5 micrometers.

12. The dichroic prism beamsplitter of claim 1, wherein the plurality of layers do not form quarter-wave stacks.

13. The dichroic prism beamsplitter of claim 1,
wherein the medium includes an entrance prism and an exit prism, and
wherein the equivalent structure is between the entrance prism and the exit prism.

14. An optical element, comprising:
a plurality of layers in a dichroic prism beamsplitter configured to cause total internal reflection and evanescent wave coupling; and
wherein the plurality of layers include one or more equivalent structures,
wherein at least one equivalent structure, of the one or more equivalent structures, includes one or more layers with a refractive index less than a refractive index threshold and a thickness less than a thickness threshold,
wherein the at least one equivalent structure causes the total internal reflection for a first wavelength range and the evanescent wave coupling for a second wavelength range to split a beam into a first portion at the first wavelength range and a second portion at the second wavelength range,
wherein the refractive index threshold is based on an angle of incidence, and
wherein the dichroic prism beamsplitter is configured to cause light associated with the first wavelength range to be reflected and light associated with the second wavelength range to be passed through.

15. The optical element of claim 14, wherein the optical element is at least one of a beamsplitter or a beam combiner.

16. The optical element of claim 14, wherein the optical element is associated with a rectangular cross-section.

17. An optical system, comprising:
an equivalent structure-based dichroic prism beamsplitter to divide a light beam into a first portion directed in a first direction associated with a first optical path and into a second portion directed in a second direction associated with a second optical path,
wherein the equivalent structure-based dichroic prism beamsplitter includes at least one layer with a thickness that is less than or equal to a threshold thickness associated with total internal reflection,
wherein the at least one layer causes the total internal reflection for a first wavelength range and causes evanescent wave coupling for a second wavelength range,
wherein the first portion is associated with the first wavelength range,
wherein the second portion is associated with the second wavelength range,
wherein the second wavelength range is different from the first wavelength range; and
at least one optical sensor disposed in at least one of the first optical path or the second optical path to receive at least one of the first portion or the second portion.

18. The optical system of claim 17, wherein the equivalent structure-based dichroic prism beamsplitter includes fewer than 200 layers.

19. The optical system of claim 17, wherein the equivalent structure-based dichroic prism beamsplitter includes fewer than 100 layers.

20. The optical system of claim 17, wherein the optical system is at least one of:
an optical communication system,
an optical sensing system,
an optical imaging system, or
an optical measurement system.

* * * * *